(12) United States Patent
Baek et al.

(10) Patent No.: US 8,920,689 B2
(45) Date of Patent: Dec. 30, 2014

(54) PHOTOSENSITIVE RESIN COMPOSITION FOR COLOR FILTER AND COLOR FILTER USING THE SAME

(71) Applicant: Cheil Industries Inc., Gumi-si (KR)

(72) Inventors: Taek-Jin Baek, Uiwang-si (KR);
Seong-Ryong Nam, Uiwang-si (KR);
Won-A Noh, Uiwang-si (KR);
Chang-Min Lee, Uiwang-si (KR);
Sang-Won Cho, Uiwang-si (KR);
Gyu-Seok Han, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 13/852,226

(22) Filed: Mar. 28, 2013

(65) Prior Publication Data

US 2014/0103269 A1    Apr. 17, 2014

(30) Foreign Application Priority Data

Oct. 11, 2012  (KR) .......................... 10-2012-0113011

(51) Int. Cl.
| | | |
|---|---|---|
| G02B 5/23 | (2006.01) | |
| G02B 5/22 | (2006.01) | |
| G02B 1/04 | (2006.01) | |
| G03C 1/00 | (2006.01) | |
| G03F 7/00 | (2006.01) | |

(52) U.S. Cl.
CPC . *G02B 1/04* (2013.01); *G02B 5/223* (2013.01)
USPC .... 252/586; 252/582; 257/432; 257/E31.127; 359/891; 430/7; 430/270.1; 430/281.1; 430/285.1; 430/286.1; 430/434; 526/319

(58) Field of Classification Search
USPC .................. 252/586, 582; 257/E31.127, 432; 427/66; 430/7, 221, 270.1, 283.1, 430/285.1, 287.1, 281.1, 286.1, 434; 524/547, 548, 553, 555, 558; 526/240, 526/257, 259, 263, 268, 284, 298, 304, 526/319; 359/891
See application file for complete search history.

(56) References Cited

U.S. PATENT DOCUMENTS

| | | | | |
|---|---|---|---|---|
| 2008/0237554 A1* | 10/2008 | Miya et al. | ..................... | 252/586 |
| 2013/0012648 A1* | 1/2013 | Fujie et al. | ..................... | 524/547 |

FOREIGN PATENT DOCUMENTS

| | | | | |
|---|---|---|---|---|
| JP | 2009-001770 A | | 1/2009 | |
| JP | 2012-032754 | * | 2/2012 | ............. G03F 7/004 |
| KR | 10-2004-0053964 A | | 6/2004 | |
| KR | 10-2005-0042416 A | | 5/2005 | |
| KR | 10-2010-0042173 A | | 4/2010 | |

* cited by examiner

*Primary Examiner* — Bijan Ahvazi

(74) *Attorney, Agent, or Firm* — Additon, Higgins & Pendleton, P.A.

(57) ABSTRACT

A photosensitive resin composition for a color filter includes (A) a dye polymer composite including a repeating unit derived from a compound represented by the following Chemical Formula 1, wherein in Chemical Formula 1, each substituent is the same as described in the detailed description, (B) an acrylic-based photopolymerizable monomer, (C) a photopolymerization initiator, and (D) a solvent, and a color filter using the same.

[Chemical Formula 1]

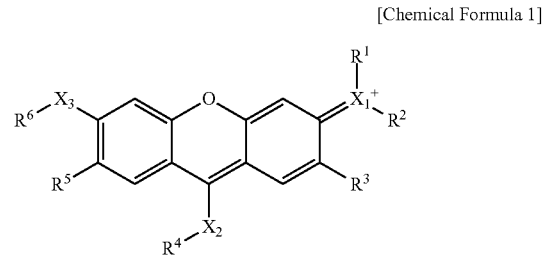

13 Claims, No Drawings

PHOTOSENSITIVE RESIN COMPOSITION FOR COLOR FILTER AND COLOR FILTER USING THE SAME

CROSS-REFERENCE TO RELATED APPLICATIONS

This application claims priority to and the benefit of Korean Patent Application No. 10-2012-0113011 filed in the Korean Intellectual Property Office on Oct. 11, 2012, the entire disclosure of which is incorporated herein by reference.

FIELD

This disclosure relates to a photosensitive resin composition for a color filter and a color filter using the same.

BACKGROUND

Color filters are used for liquid crystal displays (LCDs), optical filters for cameras, and the like. Color filters may be fabricated by coating a fine region with three or more colors on a charge-coupled device or a transparent substrate. A colored thin film can be fabricated using methods such as dyeing, printing, electrophoretic deposition (EPD), pigment dispersion, and the like.

The color filter is prepared through many chemical treatments during the manufacturing process. Accordingly, in order to maintain a pattern formed under the aforementioned conditions, a color photosensitive resin is required to have a development margin but chemical resistance and thus to improve yield of a color filter.

Particularly, since a color filter of a liquid crystal display device is formed on a TFT array panel using color filter-on-array (COA) method, a process of forming a transparent electrode on a color filter is needed. The transparent electrode may be fabricated by sequentially forming a transparent conductive layer and a photosensitive resin layer on a color filter, exposing and developing and patterning the photosensitive resin layer, and etching the transparent conductive layer with the use of the patterned photosensitive resin layer. The color filter is required to have chemical resistance because the color filter may be exposed to diverse liquid chemicals, such as a stripping solution for developing the photosensitive resin layer. Also, the color filter is required to have heat resistance because a plurality of heat treatments are required to form the color filter.

Accordingly, there is a need for a color filter that has excellent chemical resistance and heat resistance, and can provide a pixel layer having a high contrast ratio.

SUMMARY

One embodiment provides a photosensitive resin composition for a color filter that can have excellent heat resistance and chemical resistance.

Another embodiment provides a color filter that can have improved pattern developability, luminance, and contrast ratio using the photosensitive resin composition for a color filter.

According to one embodiment, provided is a photosensitive resin composition for a color filter that includes (A) a dye polymer composite including a repeating unit derived from a compound represented by the following Chemical Formula 1; (B) an acrylic-based photopolymerizable monomer; (C) a photopolymerization initiator; and (D) a solvent.

[Chemical Formula 1]

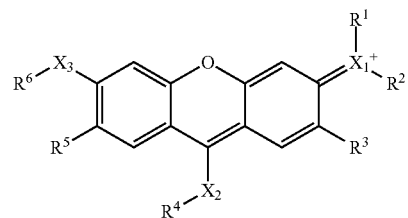

In Chemical Formula 1, $X_1$ is nitrogen, substituted or unsubstituted C3 to C30 cycloalkenylene, substituted or unsubstituted C3 to C30 heterocycloalkenylene, substituted or unsubstituted C6 to C30 arylene, substituted or unsubstituted C6 to C30 alkylarylene, or substituted or unsubstituted C3 to C30 heteroarylene, $X_2$ and $X_3$ are the same or different and are independently —NR'— (wherein R' is hydrogen or substituted or unsubstituted C1 to C10 alkyl), —O—, —S—, —SO$_2$—, substituted or unsubstituted C6 to C30 arylene, substituted or unsubstituted C6 to C30 alkylarylene, or substituted or unsubstituted C3 to C30 heteroarylene, and $R^1$ to $R^6$ are the same or different and are independently hydrogen, substituted or unsubstituted C1 to C30 alkyl, substituted or unsubstituted C6 to C30 aryl, substituted or unsubstituted C6 to C30 alkylaryl, substituted or unsubstituted C3 to C30 heteroaryl, or substituted or unsubstituted (meth)acrylate group, provided at least one of $R^1$ to $R^6$ is a substituted or unsubstituted (meth)acrylate group, and at least one other of $R^1$ to $R^6$ is a counter ion of $X_1^+$.

In the above Chemical Formula 1, the (meth)acrylate group that is at least one of $R^1$ to $R^6$ may be represented by the following Chemical Formula 2.

[Chemical Formula 2]

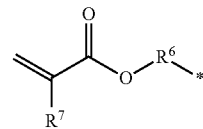

In Chemical Formula 2, $R^7$ is hydrogen, substituted or unsubstituted C1 to C30 alkyl, substituted or unsubstituted C6 to C30 aryl, substituted or unsubstituted C6 to C30 alkylaryl, or substituted or unsubstituted C3 to C30 heteroaryl, and $R^8$ is a single bond, substituted or unsubstituted C1 to C30 alkylene, substituted or unsubstituted C6 to C30 arylene, substituted or unsubstituted C6 to C30 alkylarylene, substituted or unsubstituted C3 to C30 heteroarylene, or a linking group represented by the following Chemical Formula 2-1.

[Chemical Formula 2-1]

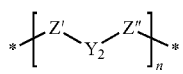

In Chemical Formula 2-1,

Z' and Z" are the same or different and are independently substituted or unsubstituted C1 to C30 alkylene, $Y_2$ is —NH—, —S—, or —O—, and n is an integer ranging from 1 to 5.

In the above Chemical Formula 1, the $X_1^+$ counter ion that is at least one of $R^1$ to $R^6$ is $SO_3^-$, a carboxylic acid ion, or a halogen ion.

The compound represented by the above Chemical Formula 1 may include a compound represented by the following Chemical Formula 3.

[Chemical Formula 3]

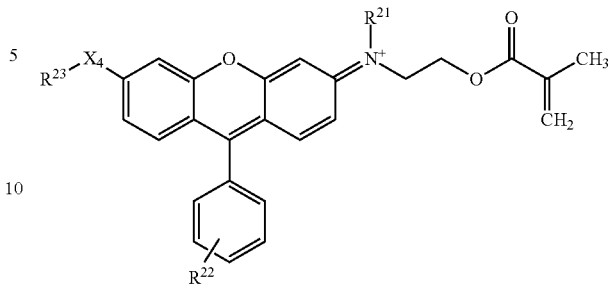

In Chemical Formula 3, $R^{21}$ to $R^{23}$ are the same or different and are independently hydrogen, substituted or unsubstituted C1 to C30 alkyl, substituted or unsubstituted C6 to C30 aryl, substituted or unsubstituted C6 to C30 alkylaryl, substituted or unsubstituted C3 to C30 heteroaryl, or substituted or unsubstituted (meth)acrylate group, provided at least one of $R^{21}$ to $R^{23}$ is a (meth)acrylate group represented by the above Chemical Formula 2, and at least one other of $R^{21}$ to $R^{23}$ is $SO_3^-$, a carboxylic acid ion, or a halogen ion, and $X_4$ is —NR'— (wherein R' is hydrogen or substituted or unsubstituted C1 to C10 alkyl), —O—, —S—, —$SO_2$—, substituted or unsubstituted C6 to C30 arylene, substituted or unsubstituted C6 to C30 alkylarylene, or substituted or unsubstituted C3 to C30 heteroarylene.

The compound represented by the above Chemical Formula 1 may include one or more of compounds represented by the following Chemical Formulae 4 to 6.

[Chemical Formula 4]

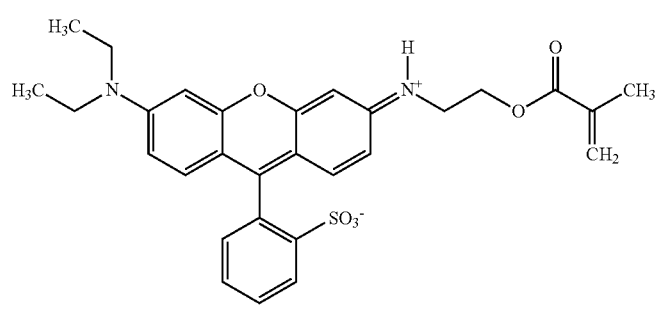

[Chemical Formula 5]

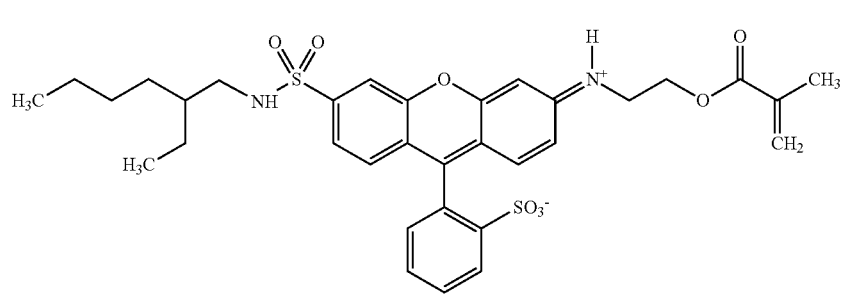

-continued

[Chemical Formula 6]

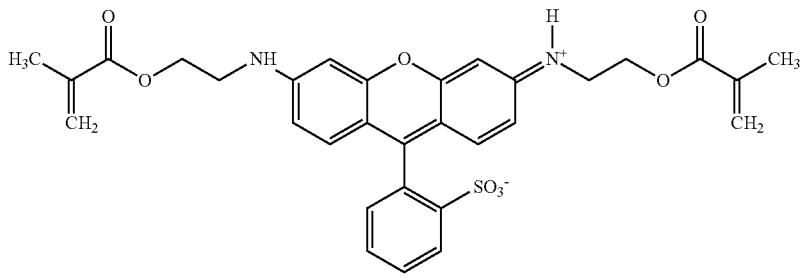

The repeating unit derived from the compound represented by the above Chemical Formula 1 may be included in an amount of about 0.1 wt % to about 50 wt % based on the total amount (weight) of the dye polymer composite (A).

The dye polymer composite (A) may have a weight average molecular weight (Mw) of about 1,000 to about 500,000 g/mol.

The dye polymer composite (A) may further include at least one of repeating units represented by the following Chemical Formulae 7 to 9.

[Chemical Formula 7]

$$\ast\!\!-\!\!\left(\!\!\begin{array}{c}R^9\\ \\ \end{array}\!\!\right)\!\!-\!\!\ast$$
with $-\!\!\underset{\|}{\text{C}}\!\!-\!\!\text{O}\!\!-\!\!(\ldots)\!\!-\!\!\underset{\|}{\text{C}}\!\!-\!\!\text{O}\!\!-\!\!)_m\!R^{10}$

[Chemical Formula 8]

$$\ast\!\!-\!\!\left(\!\!\begin{array}{c}R^{11}\\ \\ R^{12}\end{array}\!\!\right)\!\!-\!\!\ast$$

[Chemical Formula 9]

$$\ast\!\!-\!\!\left(\!\!\begin{array}{cc}R^{13}\\ &R^{14}\\ R^{15}\\ &R^{16}\end{array}\!\!\right)\!\!-\!\!\ast$$

In Chemical Formulae 7 to 9,
$R^9$, $R^{10}$, $R^{11}$, $R^{13}$, and $R^{14}$ are the same or different and are independently hydrogen, substituted or unsubstituted C1 to C30 alkyl, substituted or unsubstituted C6 to C30 aryl, or substituted or unsubstituted C6 to C30 alkylaryl, $R^{12}$ is substituted or unsubstituted C1 to C30 alkyl, substituted or unsubstituted C6 to C30 aryl, or —CO—$R^{17}$—COOH (wherein $R^{17}$ is substituted or unsubstituted C1 to C30 alkylene or substituted or unsubstituted C1 to C30 alkoxylene), $R^{15}$ is —COOH or —CONH$R^{18}$ (wherein $R^{18}$ is substituted or unsubstituted C1 to C30 alkyl or substituted or unsubstituted C6 to C30 aryl), $R^{16}$ is —COOH, or the $R^{15}$ and $R^{16}$ are fused to each other to provide a ring, and m is an integer ranging from 0 to 5.

The dye polymer composite (A) may include the above Chemical Formula 7 to 9 in amounts of o, p and q mol %, respectively, and the o, p, and q may be in the following ranges: $0 \le o \le 80$, $0 \le p \le 80$ and $0 \le q \le 80$, $o+p+q=100$.

The repeating units represented by the above Chemical Formulae 7 to 9 may be included in an amount of about 0.1 to about 50 wt % based on the total amount (weight) of the dye polymer composite (A).

The photosensitive resin composition for a color filter may include about 0.5 wt % to about 40 wt % of the dye polymer composite (A); about 0.5 wt % to about 20 wt % of the acrylic-based photopolymerizable monomer (B); about 0.1 wt % to about 10 wt % of the photopolymerization initiator (C); and balance of the solvent (D).

The photosensitive resin composition for a color filter may further include a colorant comprising a pigment, a dye, or a combination thereof. The colorant (E) may be included in an amount of about 0.1 wt % to about 40 wt % based on the total amount (weight) of the photosensitive resin composition for a color filter.

According to another embodiment, a color filter manufactured by using the photosensitive resin composition for a color filter is provided.

Other embodiments are described in the detailed description.

The photosensitive resin composition for a color filter may provide a color filter having a high contrast ratio and brightness characteristics due to excellent heat resistance and chemical resistance.

DETAILED DESCRIPTION

The present invention will be described more fully hereinafter in the following detailed description of the invention, in which some but not all embodiments of the invention are described. Indeed, this invention may be embodied in many different forms and should not be construed as limited to the embodiments set forth herein; rather, these embodiments are provided so that this disclosure will satisfy applicable legal requirements.

As used herein, when a specific definition is not otherwise provided, the term "alkyl" may refer to C1 to C30 alkyl, the term "alkenyl" may refer to C2 to C30 alkenyl, the term "cycloalkenyl" may refer to C3 to C30 cycloalkenyl, the term "heterocycloalkenyl" may refer to C3 to C30 heterocycloalkenyl, the term "aryl" may refer to C6 to C30 aryl, the term "arylalkyl" may refer to C6 to C30 arylalkyl, the term "alkylene" may refer to C1 to C20 alkylene, the term "arylene" may refer to C6 to C30 arylene, the term "alkylarylene" may refer to C6 to C30 alkylarylene, the term "heteroarylene" may refer to C3 to C30 heteroarylene, and the term "alkoxylene" may refer to C1 to C20 alkoxylene.

As used herein, when a specific definition is not otherwise provided, the term "substituted" refers to one substituted with one or more substituents including halogen (F, Cl, Br, or I), a hydroxyl group, a nitro group, a cyano group, an imino group (=NH, or =NR, wherein R is a C1 to C10 alkyl group), an amino group (—NH2, —NH(R'), or —N(R")(R'''), wherein R' to R''' are the same or different and are independently C1 to C10 alkyl), an amidino group, a hydrazine or hydrazone group, a carboxyl group, substituted or unsubstituted C1 to C30 alkyl, substituted or unsubstituted C6 to C30 aryl, substituted or unsubstituted C3 to C30 cycloalkyl, substituted or unsubstituted C3 to C30 heteroaryl, substituted or unsubstituted C2 to C30 heterocycloalkyl, or a combination thereof instead of at least one hydrogen of a functional group.

As used herein, when a definition is not otherwise provided, the term "hetero" may refer to one including an atom including N, O, S, P, or a combination thereof, in place of a carbon atom.

As used herein, "*" denotes a position linked to the same or different atom or chemical formula.

A photosensitive resin composition for a color filter according to one embodiment includes (A) a dye polymer composite; (B) an acrylic-based photopolymerizable monomer; (C) a photopolymerization initiator; and (D) a solvent.

Hereinafter, each component of the photosensitive resin composition for a color filter is described in detail.

(a) Dye Polymer Composite

The dye polymer composite includes a copolymer including a repeating unit derived from a compound represented by the following Chemical Formula 1.

[Chemical Formula 1]

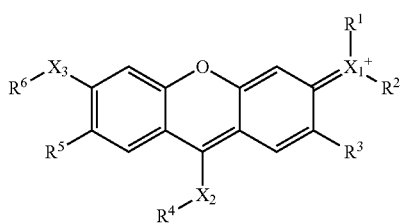

In Chemical Formula 1, $X_1$ is nitrogen, substituted or unsubstituted C3 to C30 cycloalkenylene, substituted or unsubstituted C3 to C30 heterocycloalkenylene, substituted or unsubstituted C6 to C30 arylene, substituted or unsubstituted C6 to C30 alkylarylene, or substituted or unsubstituted C3 to C30 heteroarylene, $X_2$ and $X_3$ are the same or different and are independently —NR'— (wherein R' is hydrogen or substituted or unsubstituted C1 to C10 alkyl), —O—, —S—, —SO$_2$—, substituted or unsubstituted C6 to C30 arylene, substituted or unsubstituted C6 to C30 alkylarylene, or substituted or unsubstituted C3 to C30 heteroarylene, $R^1$ to $R^6$ are the same or different and are independently hydrogen, substituted or unsubstituted C1 to C30 alkyl, substituted or unsubstituted C6 to C30 aryl, substituted or unsubstituted C6 to C30 alkylaryl, substituted or unsubstituted C3 to C30 heteroaryl, or substituted or unsubstituted (meth)acrylate group, provided at least one of $R^1$ to $R^6$ is a substituted or unsubstituted (meth)acrylate group, and at least one other of $R^1$ to $R^6$ is a counter ion of $X_1^+$.

In the above Chemical Formula 1, at least one of $R^1$ to $R^6$ includes the substituted or unsubstituted (meth)acrylate group, and thus the compound represented by the above Chemical Formula 1 undergoes a copolymerization reaction to constitute a repeating unit of the dye polymer composite.

The (meth)acrylate group may be represented by the following Chemical Formula 2.

[Chemical Formula 2]

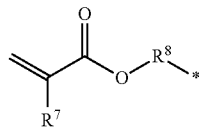

In Chemical Formula 2, $R^7$ is hydrogen, substituted or unsubstituted C1 to C30 alkyl, substituted or unsubstituted C6 to C30 aryl, substituted or unsubstituted C6 to C30 alkylaryl, or substituted or unsubstituted C3 to C30 heteroaryl, and $R^8$ is a single bond, substituted or unsubstituted C1 to C30 alkylene, substituted or unsubstituted C6 to C30 arylene, substituted or unsubstituted C6 to C30 alkylarylene, substituted or unsubstituted C3 to C30 heteroarylene, or a linking group represented by the following Chemical Formula 2-1.

[Chemical Formula 2-1]

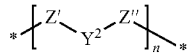

In Chemical Formula 2-1,

Z' and Z" are the same or different and are independently substituted or unsubstituted C1 to C30 alkylene, $Y_2$ is —NH—, —S—, or —O—, and n is an integer ranging from 1 to 5.

In the above Chemical Formula 1, the $X_1^+$ counter ion that is at least one of $R^1$ to $R^6$ may include $SO_3^-$, a carboxylic acid ion, or a halogen ion.

The compound represented by the above Chemical Formula 1 may include a compound represented by the following Chemical Formula 3.

[Chemical Formula 3]

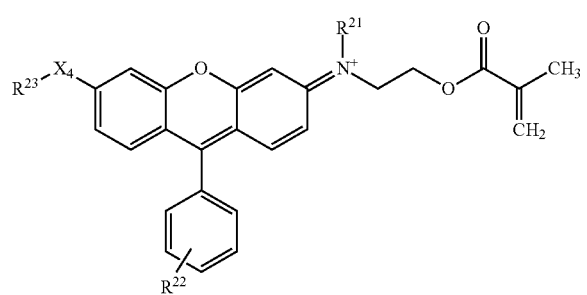

In Chemical Formula 3, $R^{21}$ to $R^{23}$ are the same or different and are independently hydrogen, substituted or unsubstituted C1 to C30 alkyl, substituted or unsubstituted C6 to C30 aryl, substituted or unsubstituted C6 to C30 alkylaryl, substituted or unsubstituted C3 to C30 heteroaryl, or substituted or unsubstituted (meth)acrylate group, provided at least one of $R^{21}$ to $R^{23}$ is a (meth)acrylate group represented by the above Chemical Formula 2, and at least one other of $R^{21}$ to $R^{23}$ is $SO_3^-$, a carboxylic acid ion, or a halogen ion, and $X_4$ is —NR'— (wherein R' is hydrogen or substituted or unsubstituted C1 to C10 alkyl), —O—, —S—, —SO$_2$—, substituted or unsubstituted C6 to C30 arylene, substituted or unsubstituted C6 to C30 alkylarylene, or substituted or unsubstituted C3 to C30 heteroarylene.

The compound represented by the above Chemical Formula 1 may include one or more of compounds represented by the following Chemical Formulae 4 to 6.

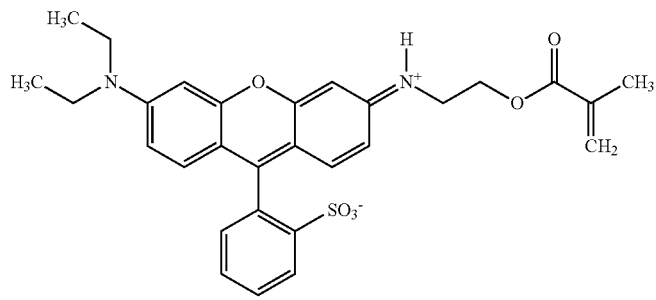

[Chemical Formula 4]

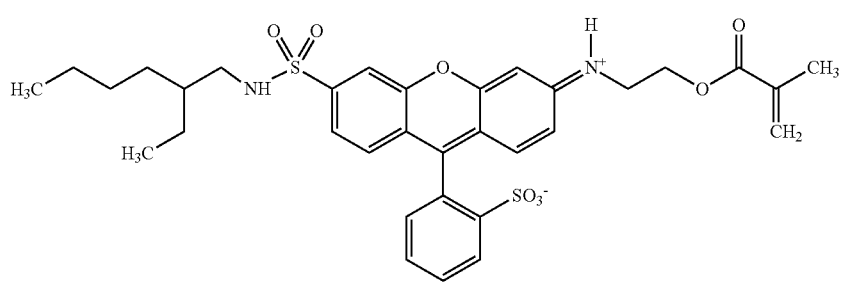

[Chemical Formula 5]

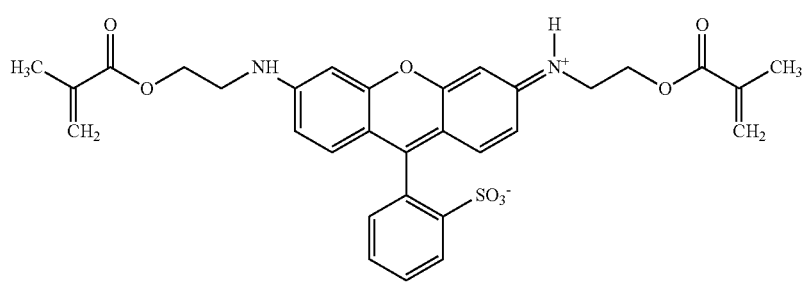

[Chemical Formula 6]

The dye polymer composite may be obtained by copolymerizing a dye such as the compound represented by the above Chemical Formula 1 with another copolymerizable monomer. The dye polymer composite may have a high molecular weight due to the copolymerization reaction. Accordingly, a low-molecular dye may not be extracted with water or an organic solvent and it can have high heat resistance and chemical resistance in the process of manufacturing a color filter.

The amount of the repeating unit derived from the compound represented by the above Chemical Formula 1 may be adjusted according to the purpose or desired properties of the dye polymer composite. For example, the dye polymer composite (A) may include a repeating unit derived from the compound represented by the above Chemical Formula 1 in an amount of about 0.1 to about 50 wt %, for example about 1 to about 40 wt %, based on the total amount (weight) of the dye polymer composite. In some embodiments, the dye polymer composite (A) may include a repeating unit derived from the compound represented by the above Chemical Formula 1 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the repeating unit derived from the compound represented by the above Chemical Formula 1 can be in a range from about any of the foregoing amounts to about any other of the foregoing amounts.

When the dye polymer composite (A) includes the repeating unit derived from the compound represented by the above Chemical Formula 1 in an amount within the above range, dye precipitation may not occur due to excessive dyes, excellent chemical resistance and chemical resistance may be obtained, pattern stability can be improved, and light transmission characteristics may not deteriorate.

The dye polymer composite may further include a first repeating unit derived from the first ethylenic unsaturated monomer and a second repeating unit derived from a second ethylenic unsaturated monomer copolymerizable with the first ethylenic unsaturated monomer, along with the repeating unit derived from the compound represented by the above Chemical Formula 1.

The first ethylenic unsaturated monomer is an ethylenic unsaturated monomer including at least one carboxyl group. Examples of the first ethylenic unsaturated monomer may include without limitation acrylic acid, methacrylic acid, maleic acid, itaconic acid, fumaric acid, and the like, and combinations thereof.

The dye polymer composite (A) may include the first ethylenic unsaturated monomer in an amount of about 1 wt % to about 50 wt %, for example about 3 wt % to about 40 wt %, and as another example about 5 wt % to about 30 wt % based on the total amount (weight) of monomers used to provide the dye polymer composite. In some embodiments, the dye polymer composite (A) may include the first ethylenic unsaturated monomer in an amount of about 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the first ethylenic unsaturated monomer can be in a range from about any of the foregoing amounts to about any other of the foregoing amounts.

Examples of the second ethylenic unsaturated monomer may include without limitation alkenyl aromatic monomers, unsaturated carboxylic acid ester compounds, unsaturated carboxylic acid aminoalkyl ester compounds, carboxylic acid vinyl ester compounds, unsaturated carboxylic acid glycidyl ester compounds, vinyl cyanide compounds, unsaturated amide compounds, and the like, and combinations thereof.

Examples of the alkenyl aromatic monomer may include without limitation styrene, α-methyl styrene, vinyl toluene, vinyl benzyl methylether, and the like. Examples of the unsaturated carboxylic acid ester compound may include without limitation methyl acrylate, methyl methacrylate, ethyl acrylate, ethyl methacrylate, butyl acrylate, butyl methacrylate, 2-hydroxy ethyl acrylate, 2-hydroxy ethyl methacrylate, 2-hydroxy butyl acrylate, 2-hydroxy butyl methacrylate, benzyl acrylate, benzyl methacrylate, cyclohexyl acrylate, cyclohexyl methacrylate, phenyl acrylate, phenyl methacrylate, and the like. Examples of the unsaturated carboxylic acid aminoalkyl ester compound may include without limitation 2-amino ethyl acrylate, 2-amino ethyl methacrylate, 2-dimethyl amino ethyl acrylate, 2-dimethyl amino ethyl methacrylate, and the like. Examples of the carboxylic acid vinyl ester compound may include without limitation vinyl acetate, vinyl benzoate, and the like. Examples of the unsaturated carboxylic acid glycidyl ester compound may include without limitation glycidyl acrylate, glycidyl methacrylate, and the like. Examples of the vinyl cyanide compound may include without limitation acrylonitrile, methacrylonitrile, and the like. Examples of the unsaturated amide compound may include without limitation acrylamide, methacrylamide, and the like. The unsaturated second ethylenic unsaturated monomer may be used singularly or as a mixture of two or more.

The dye polymer composite may include at least one of repeating units represented by the following Chemical Formulae 7 to 9, in addition to the repeating unit derived from the compound represented by the above Chemical Formula 1.

[Chemical Formula 7]

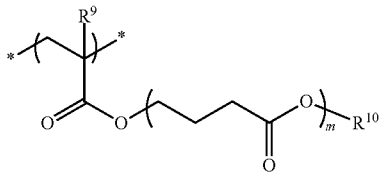

[Chemical Formula 8]

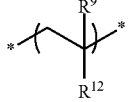

[Chemical Formula 9]

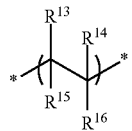

In Chemical Formulae 7 to 9, $R^9$, $R^{10}$, $R^{11}$, $R^{13}$, and $R^{14}$ are the same or different and are independently hydrogen, substituted or unsubstituted C1 to C30 alkyl, substituted or unsubstituted C6 to C30 aryl, or substituted or unsubstituted C6 to C30 alkylaryl, $R^{12}$ is substituted or unsubstituted C1 to C30 alkyl, substituted or unsubstituted C6 to C30 aryl, or —CO—$R^{17}$—COOH (wherein $R^{17}$ is substituted or unsubstituted C1 to C30 alkylene or substituted or unsubstituted C1 to C30 alkoxylene), $R^{15}$ is —COOH or —CONHR$^{18}$ (wherein $R^{18}$ is substituted or unsubstituted C1 to C30 alkyl or substituted or unsubstituted C6 to C30 aryl), and $R^{16}$ is —COOH, or the $R^{15}$ and $R^{16}$ are fused to each other to provide a ring, and m is an integer ranging from 0 to 5.

When the dye polymer composite includes repeating units represented by the above Chemical Formulae 7 to 9, each repeating unit is included in an amount of o, p, and q moles, respectively, and the o, p, and q may be in the following ranges: o+p+q=100, 0≤o≤80, 0≤o≤80, and 0≤q≤80, for example 0≤o≤50, 0≤p≤50, and 0≤q≤50.

In some embodiments, the dye polymer composite (A) may include the structural unit represented by the above Chemical Formula 7 in an amount of 0 (the structural unit of Chemical Formula 7 is not present), about 0 (the structural unit of Chemical Formula 7 is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the structural unit represented by the above Chemical Formula 7 can be in a range from about any of the foregoing amounts to about any other of the foregoing amounts.

In some embodiments, the dye polymer composite (A) may include the structural unit represented by the above Chemical Formula 8 in an amount of 0 (the structural unit of Chemical Formula 8 is not present), about 0 (the structural unit of Chemical Formula 8 is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the structural unit represented by the above Chemical Formula 8 can be in a range from about any of the foregoing amounts to about any other of the foregoing amounts.

In some embodiments, the dye polymer composite (A) may include the structural unit represented by the above Chemical Formula 9 in an amount of 0 (the structural unit of Chemical Formula 9 is not present), about 0 (the structural unit of Chemical Formula 9 is present), 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, or 80 mol %. Further, according to some embodiments of the present invention, the amount of the structural unit represented by the above Chemical Formula 9 can be in a range from about any of the foregoing amounts to about any other of the foregoing amounts.

When the repeating units represented by the above Chemical Formulae 7 to 9 are present in amounts within the above mole ratio ranges, developability, heat resistance, and chemical resistance may be improved.

The dye polymer composite (A) may include at least one or a combination of the repeating units represented by the above Chemical Formulae 7 to 9 in an amount of about 0.1 wt % to about 50 wt %, for example about 30 wt % to about 40 wt %, based on the total amount (weight) of the dye polymer composite. In some embodiments, the dye polymer composite (A) may include at least one or a combination of the repeating units represented by the above Chemical Formulae 7 to 9 in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50 wt %. Further, according to some embodiments of the present invention, the amount of the structural units represented by one or more of the above Chemical Formulae 7 to 9 can be in a range from about any of the foregoing amounts to about any other of the foregoing amounts.

When the dye polymer composite (A) includes at least one or more of repeating units represented by the above Chemical Formulae 7 to 9 in an amount within the above range, a color filter having improved chemical resistance, and pattern stability and light transmittance characteristics may be provided.

The dye polymer composite may have a weight average molecular weight (Mw) of about 1,000 to about 500,000 g/mol, for example about 5,000 to about 30,000 g/mol, and as another example about 7,000 to about 8,000 g/mol. When the dye polymer composite has a weight average molecular weight (Mw) within the above ranges, the dye polymer composite may be synthesized easily, and precipitation of the compound represented by the above Chemical Formula 1 may be reduced.

The dye polymer composite may have an acid value of about 0 to about 300 mg KOH/g, for example about 10 to about 200 mg KOH/g.

When the weight average molecular weight and acid value of the dye polymer composite falls within the above ranges, excellent developability may be obtained.

The photosensitive resin composition for a color filter may include the dye polymer composite in an amount of about 0.5 wt % to about 40 wt %, for example about 1 wt % to about 30 wt %, based on the total amount (weight) of the photosensitive resin composition for a color filter. In some embodiments, the photosensitive resin composition may include the dye polymer composite (A) in an amount of about 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the dye polymer composite (A) can be in a range from about any of the foregoing amounts to about any other of the foregoing amounts.

When the photosensitive resin composition includes the dye polymer composite in an amount within the above range, developability for an alkali developing solution can be improved, surface roughness can be reduced due to excellent cross-linking, a pattern may not be pulled out due to improved chemical resistance, and the color may not be changed even in an organic solvent.

The extent of photo cross-linking (cross-linking extent) caused by the dye polymer composite may be determined based on the composition ratio of an acrylic-based photopolymerizable monomer and a photopolymerization initiator, which is described below, and accordingly the cross-linking extent may be controlled by adjusting the composition ratio of the acrylic-based photopolymerizable monomer and the photopolymerization initiator.

(B) Acrylic-Based Photopolymerizable Monomer

The acrylic-based photopolymerizable monomer may be a photopolymerizable monomer generally known in the art for use in a photosensitive resin composition.

Examples of the acrylic-based photopolymerizable monomer may include without limitation ethyleneglycol di(meth)acrylate, diethyleneglycol di(meth)acrylate, triethyleneglycol di(meth)acrylate, propyleneglycol di(meth)acrylate, 1,4-butanediol di(meth)acrylate, 1,6-hexanediol di(meth)acrylate, neopentylglycol di(meth)acrylate, pentaerythritol di(meth)acrylate, pentaerythritol tri(meth)acrylate, pentaerythritol tetra(meth)acrylate, pentaerythritol penta(meth)acrylate, pentaerythritol hexa(meth)acrylate, dipentaerythritol di(meth)acrylate, dipentaerythritol tri(meth)acrylate, dipentaerythritol tetra(meth)acrylate, dipentaerythritol penta(meth)acrylate, dipentaerythritol hexa(meth)acrylate, bisphenol A di(meth)acrylate, trimethylolpropane tri(meth)acrylate, novolacepoxy(meth)acrylate, dipentaerythritol penta(meth)acrylate derivative including a carboxyl group, ethyleneoxide glycerinetrimethylolpropanetri(meth)acrylate, propyleneoxide glycerinetri(meth)acrylate, and the like, and combinations thereof.

The acrylic-based photopolymerizable monomer may be a monomer including a carboxyl group, since such monomers tend to react with a cyclic ether and thereby can improve solvent-resistance. Examples of the acrylic-based photopolymerizable monomer including the carboxyl group may include without limitation esters of hydroxyl group-containing (meth)acrylate and carboxylic polyacid; esters of hydroxyl group-containing (meth)acrylate and carboxylic polyacid anhydride, and the like, and combinations thereof.

Examples of the hydroxyl group-containing (meth)acrylates include without limitation trimethylolpropane di(meth)acrylate, glycerine di(meth)acrylate, pentaerythritol tri(meth)acrylate, dipentaerythritol penta(meth)acrylate, and the like, and combinations thereof.

Examples of the carboxylic polyacids may include without limitation aromatic carboxylic polyacids such as phthalic acid, 3,4-dimethylphthalic acid, isophthalic acid, terephthalic acid, pyromellitic acid, trimellitic acid, 1,4,5,8-naphthalenetetracarboxylic acid, 3,3',4,4'-benzophenonetetracarboxylic acid, and the like; aliphatic carboxylic polyacids such as succinic acid, glutaric acid, sebacic acid, 1,2,3,4-butanetetracarboxylic acid, maleic acid, fumaric acid, itaconic acid, and the like; alicyclic carboxylic polyacids such as hexahydrophthalic acid, 3,4-dimethyltetrahydrophthalic acid, hexahydroisophthalic acid, hexahydroterephthalic acid, 1,2,4-cyclopentanetricarboxylic acid, 1,2,4-cyclohexanetricarboxylic acid, cyclopentanetetracarboxylic acid, 1,2,4,5-cyclohexane, tetracarboxylic acid, and the like, and combinations thereof.

Examples of the carboxylic polyacid anhydride may include without limitation aromatic carboxylic polyacid anhydrides such as phthalic anhydride, pyromellitic anhydride, trimellitic anhydride, 3,3',4,4'-benzophenone tetracarboxylic acid 2 anhydride, and the like; aliphatic carboxylic polyacid anhydrides such as itaconic anhydride, succinic anhydride, citraconic anhydride, dodecenylsuccinic anhydride, tricarbalyl anhydride, maleic anhydride, 1,2,3,4-butanetetracarboxylic acid 2 anhydride, and the like; alicyclic carboxylic polyacid anhydrides such as hexahydrophthalic acid, 3,4-dimethyl tetrahydrophthalic anhydride, 1,2,4-cyclopentane tricarboxylic acid anhydride, 1,2,4-cyclohexane tricarboxylic acid anhydride, cyclopentane tetracarboxylic acid 2 anhydride, 1,2,4,5-cyclohexane tetracarboxylic acid 2 anhydride, himic anhydride, nadic acid anhydride, and the like; carboxylic acid anhydrides including an ester group such as ethylene glycol bistrimellitate acid, glycerine tristrimellitate anhydride, and the like, and combinations thereof.

Examples of the acrylic-based photopolymerizable monomer including a carboxyl group may include without limitation phthalic acid esters of trimethylol propane di(meth)acrylate, succinic acid esters of glycerine di(meth)acrylate, phthalic acid esters of pentaerythritol tri(meth)acrylate, succinic acid esters of pentaerythritol triacrylate, phthalic acid esters of dipentaerythritol penta(meth)acrylate, succinic acid esters of dipentaerythritol penta(meth)acrylate, and the like, and combinations thereof.

The photosensitive resin composition for a color filter may include the acrylic-based photopolymerizable monomer in an amount of about 0.5 wt % to about 20 wt %, for example about 1 to about 10 wt %, based on the total amount (weight) of the photosensitive resin composition for a color filter. In some embodiments, the photosensitive resin composition may include the acrylic-based photopolymerizable monomer in an amount of about 0.5, 0.6, 0.7, 0.8, 0.9, 1, 2, 3, 4, 5, 6, 7, 8, 9, 10, 11, 12, 13, 14, 15, 16, 17, 18, 19, or 20 wt %. Further, according to some embodiments of the present invention, the amount of the acrylic-based photopolymerizable monomer can be in a range from about any of the foregoing amounts to about any other of the foregoing amounts.

When the photosensitive resin composition for a color filter includes the acrylic-based photopolymerizable monomer in an amount within the above range, a pattern can be formed with clear edges and developability in an alkali developing solution can be excellent.

(C) Photopolymerization Initiator

Examples of the photopolymerization initiator may include without limitation triazine-based compounds, acetophenone-based compounds, biimidazole-based compounds, benzoin-based compounds, benzophenone-based compounds, thioxanthone-based compounds, oxime-based compounds, and the like, and combinations thereof.

Examples of the triazine-based compound may include without limitation 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine, 2,4-bis(trichloromethyl)-6-[2-(5-methylfuran-2-yl)ethenyl]-1,3,5-triazine, 2,4-bis(trichloromethyl)-6-[2-(furan-2-yl)ethenyl]-1,3,5-triazine, 2,4-bis(trichloromethyl)-6-[2-(4-diethylamino-2-methyl phenyl)ethenyl]-1,3,5-triazine, 2,4-bis(trichloromethyl)-6-[2-(3,4-dimethoxyphenyl)ethenyl]-1,3,5-triazine, 2,4-bis(trichloromethyl)-6-piperonyl)-1,3,5-triazine, 2,4,6-trichloro-s-triazine, 2-phenyl-4,6-bis(trichloro methyl)-s-triazine, 2-(3',4'-dimethoxy styryl)-4,6-bis(trichloro methyl)-s-triazine, 2-(4'-methoxy naphthyl)-4,6-bis(trichloro methyl)-s-triazine, 2-(p-methoxy phenyl)-4,6-bis(trichloro methyl)-s-triazine, 2-(p-tolyl)-4,6-bis(trichloro methyl)-s-triazine, 2-biphenyl-4,6-bis(trichloro methyl)-s-triazine, bis (trichloro methyl)-6-styryl-s-triazine, 2-(naphto-1-yl)-4,6-bis(trichloro methyl)-s-triazine, 2-(4-methoxy naphto-1-yl)-4,6-bis(trichloro methyl)-s-triazine, 2-4-trichloro methyl (piperonyl)-6-triazine, 2-4-trichloro methyl(4'-methoxy styryl)-6-triazine, and the like, and combinations thereof. In one embodiment, 2,4-bis(trichloromethyl)-6-(4-methoxyphenyl)-1,3,5-triazine, 2,4-bis(trichloromethyl)-6-(4-methoxynaphthyl)-1,3,5-triazine, 2,4-bis(trichloromethyl)-6-(4-methoxystyryl)-1,3,5-triazine and/or 2,4-bis(trichloromethyl)-6-piperonyl-1,3,5-triazine may be used, and in another embodiment, 2,4-bis(trichloromethyl)-6-piperonyl-1,3,5-triazine may be used.

Examples of the acetophenone-based compound may include without limitation diethoxyacetophenone, 2-methyl-2-morpholino-1-(4-methylthiophenyl)propan-1-one, 2-hydroxy-2-methyl-1-phenylpropan-1-one, benzyldimethylketal, 2-hydroxy-2-methyl-1-[4-(2-hydroxyethoxy)phenyl]propan-1-one, 1-hydroxycyclohexylphenylketone, 2-benzyl-2-dimethylamino-1-(4-morpholinophenyl)butan-1-one, 2-(4-methylbenzyl)-2-dimethylamino-1-(4-morpholinophenyl)butan-1-one, 2-hydroxy-2-methyl-1-[4-(1-methylvinyl)phenyl]propan-1-one, and the like, and combinations thereof. In one embodiment, 2-methyl-2-morpholino-1-(4-methylthiophenyl)propan-1-one, 2-benzyl-2-dimethylamino-1-(4-morpholinophenyl)butan-1-one and/or 2-(4-methylbenzyl)-2-dimethyl amino-1-(4-morpholinophenyl)butan-1-one, for example, 2-benzyl-2-dimethylamino-1-(4-morpholinophenyl)butan-1-one and/or 2-(4-methylbenzyl)-2-dimethylamino-1-(4-morpholinophenyl)butan-1-one may be used.

Examples of the biimidazole-based compound may include without limitation 2,2'-bis(2-chlorophenyl)-4,4',5,5'-tetraphenylbiimidazole, 2,2'-bis(2-chlorophenyl)-4,4',5,5'-tetra(4-carboethoxyphenyl)biimidazole, 2,2',-bis(2-chlorophenyl)-4,4',5,5'-tetra(4-bromophenyl)biimidazole, 2,2'-bis(2-chlorophenyl)-4,4',5,5'-tetra(2,4-dichlorophenyl) biimidazole, 2,2'-bis(2-bromophenyl)-4,4',5,5'-tetraphenylbiimidazole, 2,2'-bis(2,4-dichlorophenyl)-4,4',5,5'-tetraphenylbiimidazole, 2,2'-bis(2-chlorophenyl)-4,4',5,5'-tetra(m-methoxyphenyl)biimidazole, 2,2'-bis(2,3-dichlorophenyl)-4,4',5,5'-tetraphenylbiimidazole, 2,2'-bis(2,6-dichlorophenyl)-4,4',5,5'-tetraphenylbiimidazole, 2,2'-bis(2-nitrophenyl)-4,4',5,5'-tetraphenylbiimidazole and 2,2'-bis(2-methylphenyl)-4,4',5,5'-tetraphenylbiimidazole, and the like, and combinations thereof. In one embodiment, 2,2'-bis(2-chlorophenyl)-4,4',5,5'-tetraphenylbiimidazole and/or 2,2'-bis(2,3-dichlorophenyl)-4,4',5,5'-tetraphenylbiimidazole may be used.

Examples of the benzoin-based compound may include without limitation benzoin, benzoin methylether, benzoin ethylether, benzoin isopropylether, benzoin isobutylether, benzyldimethylketal, and the like, and combinations thereof.

Examples of the benzophenone-based compound may include without limitation benzophenone, benzoyl benzoate, o-benzoyl methyl benzoate, 4-phenyl benzophenone, hydroxy benzophenone, acrylated benzophenone, 3,3'-dimethyl-2-methoxy benzophenone, 4,4'-dichloro benzophenone, 4,4'-bis(dimethylamino)benzophenone, 4,4'-bis(diethylamino)benzophenone, 4-benzoyl-4'-methyldiphenylsulfide, 3,3',4,4'-tetra(tert-butylperoxycarbonyl)benzophenone, 2,4,6-trimethylbenzophenone, and the like, and combinations thereof.

Examples of the thioxanthone-based compound may include without limitation thioxanthone, 2-methyl thioxanthone, 2-isopropyl thioxanthone, 4-isopropyl thioxanthone, 2,4-diethyl thioxanthone, 2,4-diisopropyl thioxanthone, 2-chloro thioxanthone, 1-chloro-4-propoxythioxanone, and the like, and combinations thereof.

Examples of the oxime-based compound may include without limitation O-acyloxime-based compounds, 2-(O-benzoyloxime)-1-[4-(phenylthio)phenyl]-1,2-octadione, 1-(O-acetyloxime)-1-[9-ethyl-6-(2-methylbenzoyl)-9H-carbazol-3-yl]ethanone, O-ethoxycarbonyl-α-oxyamino-1-phenylpropan-1-one, and the like, and combinations thereof. Examples of the 0-acyloxime-based compound include without limitation 1-(4-phenylsulfanylphenyl)-butan-1,2-dione 2-oxime-O-benzoate, 1-(4-phenylsulfanylphenyl)-octane-1, 2-dione 2-oxime-O-benzoate, 1-(4-phenylsulfanylphenyl)-octan-1-oneoxime-O-acetate, 1-(4-phenylsulfanylphenyl)-butan-1-oneoxime-O-acetate, and the like, and combinations thereof.

Besides or in addition to the above photopolymerization initiator, other examples of the photopolymerization initiator that may be used include without limitation carbazole-based compounds, diketone compounds, sulfonium borate-based compounds, diazo-based compounds, and the like, and combinations thereof.

The photopolymerization initiator absorbs light and is excited and then transmits energy, and thus it may be used with a photo-sensitizer causing a chemical reaction.

The photosensitive resin composition for a color filter may include the photopolymerization initiator in an amount of about 0.1 wt % to about 10 wt %, for example about 0.5 wt % to about 5 wt %, based on the total amount (weight) of the photosensitive resin composition for a color filter. In some embodiments, the photosensitive resin composition may include the photopolymerization initiator in an amount of about 0.1, 0.2, 0.3, 0.4, 0.5, 0.6, 0.7, 0.8, 0.9, 1, 2, 3, 4, 5, 6, 7, 8, 9, or 10 wt %. Further, according to some embodiments of the present invention, the amount of the photopolymerization initiator can be in a range from about any of the foregoing amounts to about any other of the foregoing amounts.

When the photosensitive resin composition for a color filter includes the photopolymerization initiator in an amount within the above range, it may bring about sufficient photopolymerization in the patterning process, with minimal or no deterioration of transmittance due to non-reacting initiator remnants.

(D) Solvent

The solvent is required to have compatibility with the dye polymer composite (A) and other component materials but does not have a reaction therewith Examples of the solvent may include without limitation alcohols such as methanol, ethanol, and the like; ethers such as dichloroethyl ether, n-butyl ether, diisoamyl ether, methylphenyl ether, tetrahydrofuran, and the like; glycol ethers such as ethylene glycol methylether, ethylene glycol ethylether, propylene glycol methylether, and the like; cellosolve acetates such as methyl cellosolve acetate, ethyl cellosolve acetate, diethyl cellosolve acetate, and the like; carbitols such as methylethyl carbitol, diethyl carbitol, diethylene glycol monomethylether, diethylene glycol monoethylether, diethylene glycol dimethylether, diethylene glycol methylethylether, diethylene glycol diethylether, and the like; propylene glycol alkylether acetates such as propylene glycol methylether acetate, propylene glycol propylether acetate, and the like; aromatic hydrocarbons such as toluene, xylene, and the like; ketones such as methylethylketone, cyclohexanone, 4-hydroxy-4-methyl-2-pentanone, methyl-n-propylketone, methyl-n-butylketone, methyl-n-amylketone, 2-heptanone, and the like; saturated aliphatic monocarboxylic acid alkyl esters such as ethyl acetate, n-butyl acetate, isobutyl acetate, and the like; lactic acid alkyl esters such as methyl lactate, ethyl lactate, and the like; hydroxyacetic acid alkyl esters such as methyl hydroxyacetate, ethyl hydroxyacetate, butyl hydroxyacetate, and the like; acetic acid alkoxy alkyl esters such as methoxymethyl acetate, methoxyethyl acetate, methoxybutyl acetate, ethoxymethyl acetate, ethoxyethyl acetate, and the like; 3-hydroxypropionic acid alkyl esters such as methyl 3-hydroxypropionate, ethyl 3-hydroxypropionate, and the like; 3-alkoxypropionic acid alkyl esters such as methyl 3-methoxypropionate, ethyl 3-methoxypropionate, ethyl 3-ethoxypropionate, methyl 3-ethoxypropionate, and the like; 2-hydroxypropionic acid alkyl esters such as methyl 2-hydroxypropionate, ethyl 2-hydroxypropionate, propyl 2-hydroxypropionate, and the like; 2-alkoxypropionic acid alkyl esters such as methyl 2-methoxypropionate, ethyl 2-methoxypropionate, ethyl 2-ethoxypropionate, methyl 2-ethoxypropionate, and the like; 2-hydroxy-2-methylpropionic acid alkyl esters such as methyl 2-hydroxy-2-methylpropionate, ethyl 2-hydroxy-2-methylpropionate, and the like; 2-alkoxy-2-methylpropionic acid alkyl esters such as methyl 2-methoxy-2-methylpropionate, ethyl 2-ethoxy-2-methylpropionate, and the like; esters such as 2-hydroxyethyl propionate, 2-hydroxy-2-methylethyl propionate, hydroxyethyl acetate, methyl 2-hydroxy-3-methylbutanoate, and the like; or ketone acid esters such as ethyl pyruvate, and the like, a solvent having a high boiling point such as N-methylformamide, N,N-dimethylformamide, N-methylformanilide, N-methylacetamide, N,N-dimethylacetamide, N-methylpyrrolidone, dimethylsulfoxide, benzylethylether, dihexylether, acetylacetone, isophorone, caproic acid, caprylic acid, 1-octanol, 1-nonanol, benzylalcohol, benzyl acetate, ethyl benzoate, diethyl oxalate, diethyl maleate, γ-butyrolactone, ethylene carbonate, propylene carbonate, phenyl cellosolve acetate, and the like. These solvents may be used singularly or as a mixture of two or more.

The solvent is used in a balance amount, for example about 20 wt % to about 90 wt %, based on the total amount (weight) of the photosensitive resin composition for a color filter. In some embodiments, the photosensitive resin composition may include the solvent in an amount of about 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of solvent can be in a range from about any of the foregoing amounts to about any other of the foregoing amounts.

When the photosensitive resin composition for a color filter includes the solvent in an amount within the above range, the photosensitive resin composition can have good coating properties, and flatness at a thickness of greater than or equal to 1 μm may be maintained.

(E) Colorant

The photosensitive resin composition may further include a colorant other than the dye polymer composite to provide color characteristics along with the dye polymer composite (A).

The colorant may include a pigment, a dye, or a combination thereof.

The pigment may have a color such as red, green, blue, yellow, violet, and the like. Examples of the pigment may include without limitation condensed polycyclic pigments such as anthraquinone-based pigments, perylene-based pigments, and the like, phthalocyanine-based pigments, azo-based pigments, and the like. The pigments may be used singularly or in a combination of two or more. Two or more pigments may be combined to adjust maximum absorption wavelength, cross point, crosstalk, and the like.

The pigment may be dispersed in a solvent to be prepared in form of pigment dispersion and be included in the photosensitive resin composition for a color filter.

In order to disperse the pigment in the pigment dispersion uniformly, a dispersing agent may be used as needed. For this purpose, a non-ionic, anionic, or cationic dispersing agent may be used. Examples of the dispersing agent may include without limitation polyalkyleneglycols and esters thereof, polyoxyalkylenes, polyhydric alcohol ester alkylene oxide addition products, alcoholalkyleneoxide addition products, sulfonic acid esters, sulfonate salts, carboxylic acid esters, carboxylate salts, alkylamidealkyleneoxide addition products, alkylamines, and the like. These dispersing agents may be used singularly or as a mixture of two or more.

Along with the dispersing agent, a first acrylic-based resin including a carboxyl group may be added to the pigment dispersion to improve stability and improve pattern formation of pixels.

The pigment may have a primary particle diameter of about 10 nm to about 80 nm, for example about 10 nm to about 70 nm. When the pigment has a primary particle diameter within the above particle diameter range, the pigment dispersion can have excellent stability, and pixel resolution property may not deteriorate, which is desirable.

Examples of the dye may include without limitation anthraquinone-based compounds, cyanine-based compounds, mesocyanine-based compounds, azaporphyrin-based compounds, phthalocyanine-based compounds, pyrrolopyrrole-based compounds, diazo-based compounds, carbonium-based compounds, acridine-based compounds, thiazole-based compounds, quinomine-based compounds, methine-based compounds, quinoline-based compounds, and the like, and combinations thereof.

When the dispersion including the pigment and dye is used, the pigment and dye may be used in an amount of about 1:9 to about 9:1.

In some embodiments, the combination of the pigment and the dye may include the pigment in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the pigment can be in a range from about any of the foregoing amounts to about any other of the foregoing amounts.

In some embodiments, the combination of the pigment and the dye may include the dye in an amount of about 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 48, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, or 90 wt %. Further, according to some embodiments of the present invention, the amount of the dye can be in a range from about any of the foregoing amounts to about any other of the foregoing amounts.

When the pigment and the dye are used in an amount within the above ranges, high brightness and contrast ratio and desirable color characteristics may be realized.

The photosensitive resin composition for a color filter may include the pigment and/or dye in an amount of about 0.1 wt % to about 40 wt %, for example about 1 wt % to about 25 wt %, based on the total amount (weight) of the photosensitive resin composition for a color filter. In some embodiments, the photosensitive resin composition may include the pigment and/or dye in an amount of about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 wt %. Further, according to some embodiments of the present invention, the amount of the pigment and/or dye can be in a range from about any of the foregoing amounts to about any other of the foregoing amounts.

When the photosensitive resin composition for a color filter includes the pigment and/or dye in an amount within the above range, coloring effects and developability may be desirable.

(F) Other Additive(s)

The photosensitive resin composition for a color filter may further include one or more other additives such as a dispersing agent described above in order to disperse a component such as a pigment and/or a dye in a solvent (D), along with the (A) to (E) components.

Examples of the dispersing agent may include without limitation polyalkyleneglycols and esters thereof, polyoxyalkylenes, polyhydric alcohol ester alkylene oxide addition products, alcoholalkyleneoxide addition products, sulfonic acid esters, sulfonate salts, carboxylic acid esters, carboxylate salts, alkylamidealkyleneoxide addition products, alkylamines, and the like. These may be used singularly or as a combination of two or more.

The photosensitive resin composition may include the dispersing agent in an amount of about 10 to about 20 parts by weight based on about 100 parts by weight of the colorant (E).

The photosensitive resin composition for a color filter may further include one or more other additives such as but not limited to epoxy compounds; malonic acid; 3-amino-1,2-propanediol; silane-based coupling agents with a vinyl group or a (meth)acryloxy group; leveling agents; silicon-based surfactants; fluorine-based surfactants; radical polymerization initiators, and the like, and combinations thereof. Such additives may minimize or prevent staining or spotting during coating and.or generation of a residue due to non-development and may also help control leveling.

Examples of the epoxy compound may include without limitation phenol novolac epoxy compounds, tetramethyl biphenyl epoxy compounds, bisphenol A epoxy compounds, alicyclic epoxy compounds, and the like, and combinations thereof.

The photosensitive resin composition for a color filter may include the epoxy compound in an amount ranging from about 0.01 wt % to about 10 wt % based the total amount (weight) of the photosensitive resin composition for a color filter. When the epoxy compound is included in an amount within the above range, it may bring about excellent storage and process margin.

Examples of the silane-based coupling agent may include without limitation vinyl trimethoxysilane, vinyl tris(2-methoxyethoxysilane), 3-glycidoxypropyl trimethoxysilane, 2-(3, 4-epoxy cyclohexyl)ethyl trimethoxysilane, 3-chloropropyl methyldimethoxysilane, 3-chloropropyl trimethoxysilane, 3-methacryloxylpropyl trimethoxysilane, 3-mercaptopropyl trimethoxysilane, and the like, and combinations thereof.

The photosensitive resin composition for a color filter may include the silane-based coupling agent in an amount ranging from about 0.01 wt % to about 2 wt % based on the total weight of the photosensitive resin composition for a color filter. When the silane-based coupling agent is included in an amount within the above range, it may improve adherence, storage stability, and coating properties.

The silicon-based surfactant may include a surfactant including a siloxane bond, and the like. Examples of the silicon-based surfactant may include without limitation DC3PA, SH7PA, DC11PA, SH21PA, SH28PA, 29SHPA, and SH30PA of TORAY SILICONE CO., LTD.; polyester-modified silicone oils, SH8400 of TORAY SILICONE CO., LTD; KP321, KP322, KP323, KP324, KP326, KP340, and GF of SHINETSU SILICONE CO., LTD.; TSF4445, TSF4446, TSF4452, and TSF4460 of TOSHIBA SILICONE CO., LTD.; and the like, and combinations thereof.

The fluorine-based surfactant may be a surfactant having a fluorocarbon backbone, and the like. Examples of the fluorine-based surfactant may include without limitation FULORAD FC430, and FULORAD FC431 of SUMITOMO 3M CO., LTD.; MEGAFACE F142D, MEGAFACE F171, MEGAFACE F172, MEGAFACE F173, MEGAFACE F177, MEGAFACE F183, MEGAFACE F470, MEGAFACE F475, MEGAFACE R30 of DAINIPPON INK KAGAKU KOGYO CO., LTD.; EFTOP EF301, EFTOP EF303, EFTOP EF351, and EFTOP EF352 of TOCHEM RODUCTS, CO., LTD.; SURFLON S381, SURFLON S382, SURFLON SC101, and SURFLON SC105 of ASAHI GLASS CO., LTD.; E5844 of DIKIN Finechemical Laboratory; and the like, and combinations thereof.

The silicon-based surfactant and fluorine-based surfactant may be used singularly or as a mixture of two or more.

According to another embodiment, a color filter manufactured using the photosensitive resin composition for a color filter is provided.

The color filter may be applicable to various electronic devices such as a liquid crystal display device, an organic light emitting diode, an image sensor, and the like.

The color filter may be provided by coating the photosensitive resin composition on a substrate followed by patterning. The patterning may be performed by exposing and developing, wherein the exposing may be performed by radiating an UV ray, an electron beam, or an X ray having a wavelength for example of about 190 nm to about 450 nm, and as another example about 200 nm to about 400 nm.

The following examples illustrate the present invention in more detail. However, it is understood that the present invention is not limited by these examples.

Synthesis of Dye Polymer Composite

Synthesis Examples 1 to 4

A monomer represented by the following Chemical Formula 4, benzyl methacrylate, methacrylic acid, methylmethacrylate and N-benzylmaleimide are put into a flask with a condensing pipe and an agitator in the weight % set forth in the following Table 1, and 2,2'-azobis(2,4-dimethylvaleronitrile), which is an initiator, is added in an amount of about 6 parts by weight based on 100 parts by weight of the monomers. Subsequently, about 300 parts by weight of propyleneglycol monomethyletheracetate (PGMEA, solvent) is added based on 100 parts by weight of the initiator and the monomer and is agitated under a nitrogen atmosphere. The reaction solution is heated to about 90° C. and agitated for about 10 hours so as to obtain a dye-polymer composite solution.

The dye polymer composite solution obtained as above has a solid content of about 20 wt %, and has a weight average molecular weight shown in the following Table 1. The weight average molecular weight is an average molecular weight, reduced to polystyrene and measured using gel permeation chromatography (GPC).

[Chemical Formula 4]

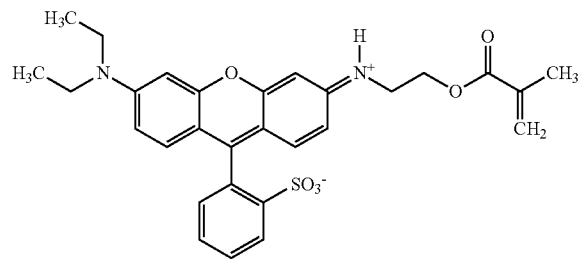

TABLE 1

|  | Synthesis Example 1 | Synthesis Example 2 | Synthesis Example 3 | Synthesis Example 4 |
| --- | --- | --- | --- | --- |
| Benzylmethacrylate (wt %) | 25 | 25 | 25 | 25 |
| Methacrylic acid (wt %) | 20 | 20 | 20 | 20 |
| Methylmethacrylate (wt %) | 35 | 30 | 25 | 20 |
| N-benzylmaleimide (wt %) | 15 | 15 | 15 | 15 |
| Monomer of Chemical Formula 4 (wt %) | 5 | 10 | 15 | 20 |
| Mw (g/mol) | 7,800 | 8,000 | 7,600 | 7,500 |

Synthesis Examples 5 to 8

Dye polymer composites are synthesized according to the same method as in Synthesis Examples 1 to 4, except that a monomer of the following Chemical Formula 5 is used instead of the monomer of the above Chemical Formula 4. The amounts of the monomers and weight average molecular weights (Mw) of the obtained dye polymer composite are shown in the following Table 2.

[Chemical Formula 5]

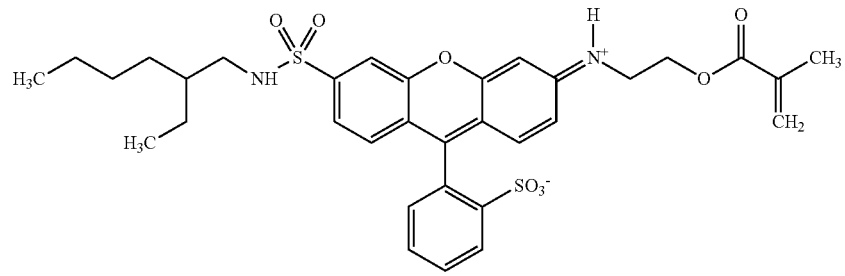

TABLE 2

|  | Synthesis Example 5 | Synthesis Example 6 | Synthesis Example 7 | Synthesis Example 8 |
| --- | --- | --- | --- | --- |
| Benzylmethacrylate (wt %) | 25 | 25 | 25 | 25 |
| Methacrylic acid (wt %) | 20 | 20 | 20 | 20 |
| Methylmethacrylate (wt %) | 35 | 30 | 25 | 20 |
| N-benzylmaleimide (wt %) | 15 | 15 | 15 | 15 |
| Monomer of Chemical Formula 5 (wt %) | 5 | 10 | 15 | 20 |
| Mw (g/mol) | 8,700 | 9,400 | 8,500 | 8,300 |

Synthesis Examples 9 to 12

Dye polymer composites are synthesized according to the same method as in Synthesis Examples 1 to 4, except that a monomer of the following Chemical Formula 6 is used instead of the monomer of the above Chemical Formula 4. The amounts of the monomers and weight average molecular weights (Mw) of the obtained dye polymer composite are shown in the following Table 3.

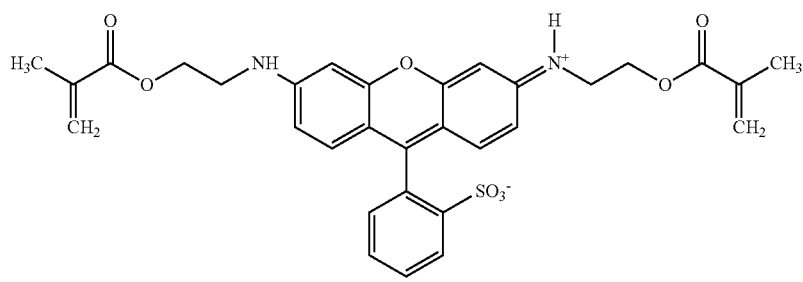

[Chemical Formula 6]

TABLE 3

|  | Synthesis Example 9 | Synthesis Example 10 | Synthesis Example 11 | Synthesis Example 12 |
| --- | --- | --- | --- | --- |
| Benzylmethacrylate (wt %) | 25 | 25 | 25 | 25 |
| Methacrylic acid (wt %) | 20 | 20 | 20 | 20 |
| Methylmethacrylate (wt %) | 35 | 30 | 25 | 20 |
| N-benzylmaleimide (wt %) | 15 | 15 | 15 | 15 |
| Monomer of Chemical Formula 6 (wt %) | 5 | 10 | 15 | 20 |
| Mw (g/mol) | 8,700 | 9,800 | 8,500 | 8,200 |

Preparation Examples 1 to 12

Preparation of Dye Polymer Composite Dispersion 3.5 wt % of each dye polymer composite prepared in Synthesis Examples 1 to 12, 12 wt % of a blue pigment (BASF, B 15:6), 6 wt % of a dispersing agent (BYK, Diperbyk 6919), and 78.5 wt % of propyleneglycol monomethyletheracetate (PGMEA) are mixed, and dispersed for 24 hours using a paint shaker (Asada Works, Co., Ltd.), to prepare dye polymer composite dispersions 1 to 12.

Preparation Example 13

Preparation of Pigment Dispersion 3.5 wt % of acrylic acid benzylmethacrylate copolymer (Miwon Commercial Co., Ltd., NPR1520), 12 wt % of blue pigment (BASF, B 15:6), 6 wt % of a dispersing agent (BYK, Diperbyk 6919), and 78.5 wt % of propyleneglycol monomethyletheracetate (PGMEA) are mixed and dispersed for 24 hours using a paint shaker (Asada Works, Co., Ltd.), to prepare a pigment dispersion.

Preparation of Photosensitive Resin Composition

Examples 1 to 12

IGACURE OXE02 (Ciba Specialty Chemicals) 0.8 wt % is dissolved in 58 wt % of propyleneglycol monomethyletheracetate (PGMEA) and 0.7 wt % of ethylethoxy propinonate, and then agitated for 30 minutes at room temperature. 5.0 wt % of dipentaerythritol hexaacrylate (DPHA) is added thereto, and 4.5 wt % of acrylic acid benzylmethacrylate copolymer (Miwon Commercial Co., Ltd., NPR1520) is added followed by agitating for 30 minutes at room temperature. 31 wt % of each of the dye polymer composite dispersions 1 to 12 according to Preparation Examples 1 to 12 is added to the resultant mixture, followed by agitating for 1 hour at room temperature and filtering it once to prepare photosensitive resin compositions.

Comparative Example 1

0.8 wt % of IGACURE OXE02 (Ciba Specialty Chemicals) is dissolved in 58 wt % of propyleneglycol monomethyletheracetate (PGMEA) and 0.7 wt % of ethylethoxy propinonate followed by agitating it for 30 minutes at room temperature. 5.0 wt % of dipentaerythritol hexaacrylate (DPHA) is added thereto, 5.5 wt % of acrylic acid benzylmethacrylate copolymer (Miwon Commercial Co., Ltd., NPR1520) is added followed by agitating for 30 minutes at room temperature. 27 wt % of the pigment dispersion according to Preparation Example 13 and 3 wt % of a violet dye (KISCO) are added to the resultant, followed by agitating for 1 hour at room temperature and filtering it once to prepare photosensitive resin compositions.

(Formation of Color Filter Pattern)

A transparent round bare glass substrate, which is not coated, is coated with the photosensitive resin compositions of Examples 1 to 12 and Comparative Example 1 to a thickness of about 3 μm by using a spin-coater (K-Spin8 of KDNS Corporation). A plurality of color filter patterns are formed by soft-baking on a hot-plate at about 80° C. for about 150 seconds, exposing with an exposer (I10C of Nikon Corporation) at power of about 60 mJ, developing at a development temperature of about 25° C. for a development time of about 60 seconds, cleaning for about 60 seconds, and spin-drying for about 25 seconds in a potassium hydroxide aqueous solution of a concentration of about 1 wt %.

Evaluation 1: Chemical Resistance

Chemical resistances of the color filter patterns formed using the photosensitive resin compositions prepared according to Examples 1 to 12 and Comparative Example 1 against a stripping solution are evaluated by immersing the color filter patterns in the stripping solution (PRS-2000 of J.T.Baker Corporation) of about 70° C. for about 10 minutes. The results are shown in the following Table 4.

The chemical resistance against the stripping solution is evaluated by a color change of the color filter patterns before and after the immersion in the stripping solution and whether the color filter patterns are delaminated after the immersion in the stripping solution.

The color change of the color filter patterns is measured using a spectrophotometer (MCPD3000 of Otsuka Electronics Corporation), and whether the color filter patterns are delaminated or not is evaluated with an optical microscope.

TABLE 4

|  | Color changes bare glass | Peeling bare glass |
|---|---|---|
| Example 1 | Excellent | Excellent |
| Example 2 | Middle | Excellent |
| Example 3 | Middle | Middle |
| Example 4 | Middle | Middle |
| Example 5 | Excellent | Excellent |
| Example 6 | Middle | Excellent |
| Example 7 | Middle | Middle |
| Example 8 | Middle | Middle |
| Example 9 | Excellent | Excellent |
| Example 10 | Excellent | Excellent |
| Example 11 | Excellent | Excellent |
| Example 12 | Middle | Excellent |
| Comparative Example 1 | Poor | Poor |

<Color Changes>
When the color change after the immersion in the stripping solution is feeble: Excellent
When the color change after the immersion in the stripping solution is middle: Middle
When the color change after the immersion in the stripping solution is strong: Poor
<Peeling>
When a photosensitive resin composition film is not delaminated: Excellent
When a photosensitive resin composition film is a little delaminated: photosensitive resin composition: Middle
When most of a photosensitive resin composition film is delaminated: Poor Evaluation 2: Heat Resistance Color filter patterns formed of the photosensitive resin compositions prepared according to Examples 1 to 12 and Comparative Example 1 are subjected to a heat treatment in an oven set to about 230° C. for about 30 minutes and the heat resistances thereof are evaluated. The results are shown in the following Table 5.

The heat resistances are evaluated by detecting the color changes of the color filter patterns before and after the heat treatment, and the color change is measured using a spectrophotometer (MCPD3000 of Otsuka Electronics Corporation).

TABLE 5

|  | Heat resistance Bare glass |
|---|---|
| Example 1 | Excellent |
| Example 2 | Excellent |
| Example 3 | Middle |
| Example 4 | Middle |
| Example 5 | Excellent |
| Example 6 | Excellent |
| Example 7 | Middle |
| Example 8 | Middle |
| Example 9 | Excellent |
| Example 10 | Excellent |
| Example 11 | Excellent |
| Example 12 | Middle |
| Comparative Example 1 | Poor |

<Heat Resistance>
When a color change is feeble after the heat treatment for 2 hours in an oven at about 230° C.: Excellent
When a color change is middle after the heat treatment for 2 hours in an oven at about 230° C.: Middle
When a color change is outstanding after the heat treatment for 2 hours in an oven at about 230° C.: Poor Evaluation 3: Brightness The photosensitive resin compositions according to Examples 1 to 12 and Comparative Example 1 are coated to 1 to 3 μm thick on a 1 mm-thick degreased glass substrate, heated on a 92° C. hot plate for 60 minutes, and then heated directly for 30 seconds followed by exposing for 60 ms using an exposer (Nikon, I10C). Then, the resultant coated substrate is dried in a 200° C. convection oven for 5 minutes to form pixel layers.

Color coordinates (x, y) and brightness (Y) of the formed pixel layers are measured using a spectrophotometer (MCPD3000, Otsuka electronic company). Quantities of light are measured when polarizing plates are close and open using contrast tester (CT-1, Tsubosaka), and contrast ratios are obtained according to the following Equation 1. The results are shown in the following Table 6.

$$\text{Contrast ratio} = L_{open}/L_{close} \qquad [\text{Equation 1}]$$

TABLE 6

|  | x | y | Y | Contrast ratio |
|---|---|---|---|---|
| Example 1 | 138.4 | 0.103 | 12.19 | 11520 |
| Example 2 | 138.5 |  | 12.18 | 11610 |
| Example 3 | 138.5 |  | 12.20 | 11611 |
| Example 4 | 138.6 |  | 12.21 | 11595 |
| Example 5 | 138.4 |  | 12.27 | 11724 |
| Example 6 | 138.5 |  | 12.24 | 11790 |
| Example 7 | 138.4 |  | 12.30 | 11815 |
| Example 8 | 138.4 |  | 12.29 | 11797 |
| Example 9 | 138.4 |  | 12.59 | 11720 |
| Example 10 | 138.5 |  | 12.65 | 11685 |
| Example 11 | 138.4 |  | 12.63 | 11817 |
| Example 12 | 138.4 |  | 12.66 | 12005 |
| Comparative Example 1 | 138.2 |  | 12.07 | 11154 |

Referring to Table 6, pixel layers manufactured using photosensitive compositions according to Examples 1 to 12 have excellent brightness and contrast ratios compared with the pixel layer manufactured using the photosensitive resin composition according to Comparative Example 1. From the results, the photosensitive resin composition including the dye polymer composite according to Examples 1 to 12 have more improved brightness and contrast ratios of pixel layers compared with Comparative Example 1.

Many modifications and other embodiments of the invention will come to mind to one skilled in the art to which this invention pertains having the benefit of the teachings presented in the foregoing descriptions. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation, the scope of the invention being defined in the claims.

Michelle K. Lee
*Director of the United States Patent and Trademark Office* and should be depicted as:
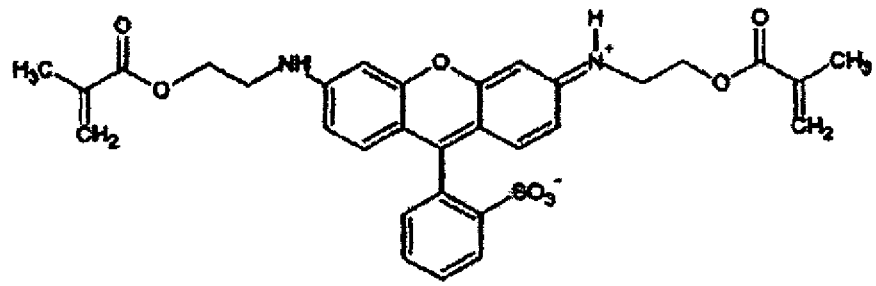

What is claimed is:

1. A photosensitive resin composition for a color filter, comprising:
   (A) a dye polymer composite including a repeating unit derived from a compound represented by the following Chemical Formula 3;
   (B) an acrylic-based photopolymerizable monomer;
   (C) a photopolymerization initiator; and
   (D) a solvent:

[Chemical Formula 3]

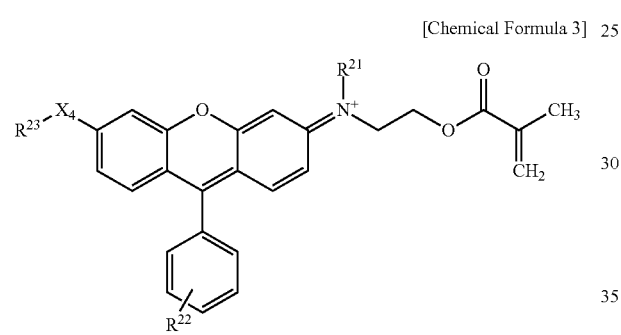

wherein, in Chemical Formula 3,
$R^{21}$ is hydrogen,
$R^{22}$ and $R^{23}$ are the same or different and are independently hydrogen, substituted or unsubstituted C6 to C30 aryl, substituted or unsubstituted C6 to C30 alkylaryl, substituted or unsubstituted C3 to C30 heteroaryl, substituted or unsubstituted (meth)acrylate group, or a counter ion of $N^+$, provided at least one of $R^{22}$ to $R^{23}$ is a counter ion of $N^+$, and
$X_4$ is —NR'—, —O—, —S—, —SO$_2$—, substituted or unsubstituted C6 to C30 arylene, substituted or unsubstituted C6 to C30 alkylarylene, or substituted or unsubstituted C3 to C30 heteroarylene, wherein R' is hydrogen or substituted or unsubstituted C1 to C10 alkyl.

2. The photosensitive resin composition of claim 1, wherein at least one of $R^{22}$ to $R^{23}$ is a (meth)acrylate group represented by the following Chemical Formula 2:

[Chemical Formula 2]

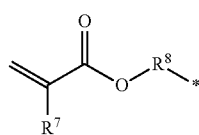

wherein, in Chemical Formula 2,
$R^7$ is hydrogen, substituted or unsubstituted C1 to C30 alkyl, substituted or unsubstituted C6 to C30 aryl, substituted or unsubstituted C6 to C30 alkylaryl, or substituted or unsubstituted C3 to C30 heteroaryl, and
$R^8$ is a single bond, substituted or unsubstituted C1 to C30 alkylene, substituted or unsubstituted C6 to C30 arylene, substituted or unsubstituted C6 to C30 alkylarylene, substituted or unsubstituted C3 to C30 heteroarylene, or a linking group represented by the following Chemical Formula 2-1:

[Chemical Formula 2-1]

wherein, in Chemical Formula 2-1,
Z' and Z" are the same or different and are independently substituted or unsubstituted C1 to C30 alkylene,
$Y_2$ is —NH—, —S—, or —O—, and
n is an integer ranging from 1 to 5.

3. The photosensitive resin composition of claim 1, wherein in Chemical Formula 3, the counter ion of $N^+$ that is at least one of $R^{22}$ to $R^{23}$ is $SO_3$—, a carboxylic acid ion, or a halogen ion.

4. The photosensitive resin composition of claim 1, wherein the compound represented by Chemical Formula 3 comprises one or more compounds represented by the following Chemical Formulae 5 to 6:

[Chemical Formula 5]

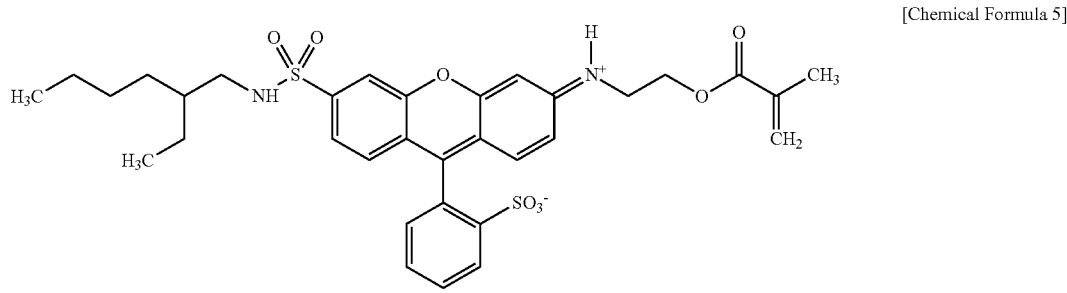

-continued

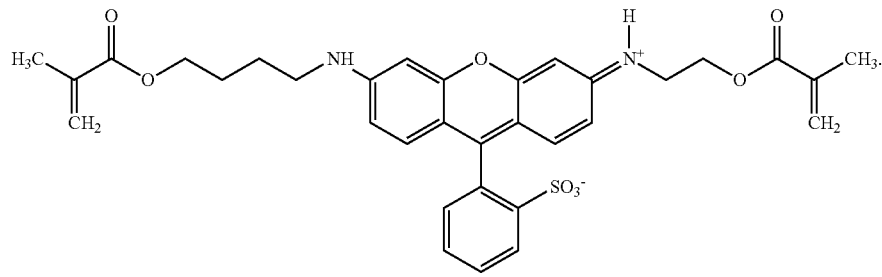

[Chemical Formula 6]

5. The photosensitive resin composition of claim 1, wherein the dye polymer composite (A) includes a repeating unit derived from the compound represented by Chemical Formula 3 in an amount of about 0.1 wt % to about 50 wt % based on the total weight of the dye polymer composite (A).

6. The photosensitive resin composition of claim 1, wherein the dye polymer composite (A) has a weight average molecular weight (Mw) of about 1,000 to about 500,000 g/mol.

7. The photosensitive resin composition of claim 1, wherein the dye polymer composite (A) further comprises at least one of repeating units represented by the following Chemical Formulae 7 to 9:

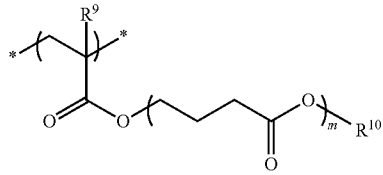

[Chemical Formula 7]

[Chemical Formula 8]

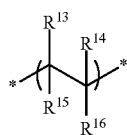

[Chemical Formula 9]

wherein, in Chemical Formulae 7 to 9, $R^9$, $R^{10}$, $R^{11}$, $R^{13}$, and $R^{14}$ are the same or different and are independently hydrogen, substituted or unsubstituted C1 to C30 alkyl, substituted or unsubstituted C6 to C30 aryl, or substituted or unsubstituted C6 to C30 alkylaryl, $R^{12}$ is substituted or unsubstituted C1 to C30 alkyl, substituted or unsubstituted C6 to C30 aryl, or —CO—$R^{17}$—COOH, wherein $R^{17}$ is substituted or unsubstituted C1 to C30 alkylene or substituted or unsubstituted C1 to C30 alkoxylene, $R^{15}$ is —COOH or —CONHR$^{18}$, wherein $R^{18}$ is substituted or unsubstituted C1 to C30 alkyl or substituted or unsubstituted C6 to C30 aryl, $R^{16}$ is —COOH, or the $R^{15}$ and $R^{16}$ are fused to each other to provide a ring, and m is an integer ranging from 0 to 5.

8. The photosensitive resin composition of claim 7, wherein the dye polymer composite (A) comprises one or more repeating units represented by Chemical Formula 7 to 9 in an amount of o, p and q mol %, respectively, and wherein o, p, and q are in the following ranges: 0≤o≤80, 0≤p≤80 and 0≤q≤80, o+p+q=100.

9. The photosensitive resin composition of claim 7, wherein the dye polymer composite (A) includes repeating units represented by one or more of Chemical Formulae 7 to 9 in an amount of about 0.1 to about 50 wt % based on the total weight of the dye polymer composite (A).

10. The photosensitive resin composition of claim 1, wherein the photosensitive resin composition for a color filter comprises about 0.5 wt % to about 40 wt % of the dye polymer composite (A);

about 0.5 wt % to about 20 wt % of the acrylic-based photopolymerizable monomer (B);

about 0.1 wt % to about 10 wt % of the photopolymerization initiator (C); and balance of the solvent (D).

11. The photosensitive resin composition of claim 1, wherein the photosensitive resin composition for a color filter further comprises a colorant (E) comprising a pigment, a dye, or a combination thereof, and wherein the colorant (E) is included in an amount of about 0.1 wt % to about 40 wt % based on the total weight of the photosensitive resin composition for a color filter.

12. A color filter manufactured by using the photosensitive resin composition according to claim 1.

13. The photosensitive resin composition of claim 1, wherein $R^{22}$ is a counter ion of N$^+$ and $R^{23}$ is substituted or unsubstituted (meth)acrylate group.

* * * * *

UNITED STATES PATENT AND TRADEMARK OFFICE
CERTIFICATE OF CORRECTION

PATENT NO. : 8,920,689 B2
APPLICATION NO. : 13/852226
DATED : December 30, 2014
INVENTOR(S) : Taek-Jin Baek et al.

It is certified that error appears in the above-identified patent and that said Letters Patent is hereby corrected as shown below:

In the Specification
Column 11, Chemical Formula 8 is depicted as:

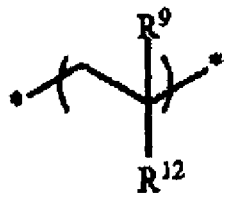

and should be depicted as:

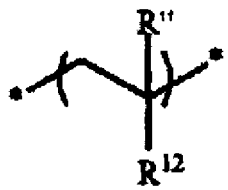

In the Claims
In Claim 4, Columns 29 and 30, Chemical Formula 6 is depicted as:

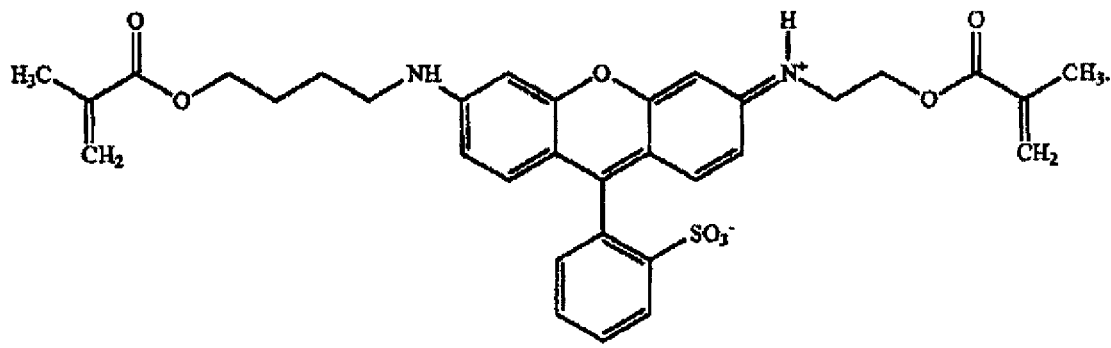

Signed and Sealed this
Second Day of June, 2015